US010967734B2

(12) United States Patent
Sui et al.

(10) Patent No.: US 10,967,734 B2
(45) Date of Patent: Apr. 6, 2021

(54) VALVE DEVICE FOR FUEL TANK

(71) Applicant: NIFCO INC., Yokosuka (JP)

(72) Inventors: Xiaohui Sui, Yokosuka (JP); Tsuyoshi Kato, Yokosuka (JP)

(73) Assignee: NIFCO INC., Yokosuka (JP)

( * ) Notice: Subject to any disclaimer, the term of this patent is extended or adjusted under 35 U.S.C. 154(b) by 99 days.

(21) Appl. No.: 16/458,807

(22) Filed: Jul. 1, 2019

(65) Prior Publication Data

US 2020/0031221 A1 Jan. 30, 2020

(30) Foreign Application Priority Data

Jul. 27, 2018 (JP) .............................. JP2018-141150

(51) Int. Cl.
*F16K 24/04* (2006.01)
*F16K 21/18* (2006.01)
(Continued)

(52) U.S. Cl.
CPC ........ *B60K 15/03519* (2013.01); *B67D 7/365* (2013.01); *F02M 37/0023* (2013.01);
(Continued)

(58) Field of Classification Search
CPC .................. B67D 7/365; B60K 15/035; B60K 15/03519; B60K 2015/03289; B60K 2015/03368; B60K 2015/03566; B60K 2015/03296; F16K 17/36; F16K 21/18; F16K 24/044; F16K 24/042; F16K 31/20; F16K 31/22; F02M 37/0023;
(Continued)

(56) References Cited

U.S. PATENT DOCUMENTS 6,170,510 B1  1/2001 King et al.
6,827,098 B2 12/2004 Sugiyama et al.
(Continued)

FOREIGN PATENT DOCUMENTS

DE  102016204770 A1  9/2017
EP     1007872 A1  6/2000
(Continued)

OTHER PUBLICATIONS

Europe Patent Office, "Search Report for European Patent Application No. 19185770.5," dated Dec. 12, 2019.
(Continued)

*Primary Examiner* — Hailey K. Do
(74) *Attorney, Agent, or Firm* — Manabu Kanesaka

(57) ABSTRACT

In a valve device for a fuel tank, a fuel liquid level of filling-up fuel feed and an allowable fuel amount of additional fuel feed can be easily and appropriately changed by replacing only a part of components forming the valve device. A first valve chamber has a structure of positioning an open end below a support portion of a first float having a passage portion for a fluid. A second valve chamber includes a support portion of a second float having a passage portion for the fluid. The first valve chamber and the second valve chamber are formed by fitting a lower-portion including the support portion and the open end of the first float and the support portion of the second float relative to an upper-portion including a first valve opening and a second valve opening.

5 Claims, 15 Drawing Sheets

(51) Int. Cl.
    *F16K 31/22*     (2006.01)
    *F16K 17/36*     (2006.01)
    *B60K 15/035*     (2006.01)
    *B67D 7/36*     (2010.01)
    *F02M 37/00*     (2006.01)
    *B60K 15/03*     (2006.01)

(52) U.S. Cl.
    CPC ............ *F16K 21/18* (2013.01); *F16K 24/044* (2013.01); *F16K 31/22* (2013.01); *B60K 2015/03289* (2013.01); *B60K 2015/03368* (2013.01); *B60K 2015/03566* (2013.01); *F16K 17/36* (2013.01); *Y10T 137/053* (2015.04); *Y10T 137/3099* (2015.04); *Y10T 137/6004* (2015.04); *Y10T 137/7404* (2015.04); *Y10T 137/7426* (2015.04); *Y10T 137/7436* (2015.04)

(58) Field of Classification Search
    CPC ......... Y10T 137/0874; Y10T 137/3099; Y10T 137/86324; Y10T 137/053; Y10T 137/0826; Y10T 137/6004; Y10T 137/7404; Y10T 137/7426; Y10T 137/7436

See application file for complete search history.

(56) References Cited

U.S. PATENT DOCUMENTS

| | | | |
|---|---|---|---|
| 7,243,639 B2 | 7/2007 | Ueki | |
| 2010/0218748 A1* | 9/2010 | Arnalsteen | F16K 17/194 |
| | | | 123/516 |
| 2014/0158216 A1* | 6/2014 | Pifer | B60K 15/035 |
| | | | 137/15.01 |
| 2019/0070954 A1 | 3/2019 | Mukasa et al. | |

FOREIGN PATENT DOCUMENTS

| | | |
|---|---|---|
| JP | 2002-285929 A | 10/2002 |
| JP | 3966762 B2 | 8/2007 |
| JP | 2017-202804 A | 11/2017 |
| KR | 1020060045662 A | 5/2006 |
| KR | 1020170100702 A | 9/2017 |

OTHER PUBLICATIONS

Korea Patent Office, "Office Action for Korean Patent Application No. 10-2019-0088983," dated Jul. 2, 2020.

* cited by examiner

VALVE DEVICE FOR FUEL TANK

CROSS-REFERENCE TO RELATED APPLICATION

The present application is based on and claims priority of Japanese Patent Application No. 2018-141150 filed on Jul. 27, 2018, the disclosure of which is incorporated herein.

BACKGROUND OF THE INVENTION AND RELATED ART STATEMENT

The present invention relates to an improvement of a valve device for a fuel tank attached to a fuel tank of an automobile, a two-wheel vehicle, and the like so as to form one portion of a ventilation passage of the fuel tank for communicating inside and outside of the fuel tank in an open valve state.

There is a valve device for a fuel tank shown in Patent Document 1 wherein two floats are housed in a parallel manner inside a case having a circular shape on an outline in horizontal cross section, and the two floats float up in stages by a fuel liquid level inside the fuel tank to close two valve openings (sealing seats) so as to detect filling-up fuel by a sensor of a fuel feed gun, and carry out an automatic stop of fuel feed, and subsequent additional fuel feed.
Patent Document 1
  Japanese Patent No. 3966762

SUMMARY OF THE INVENTION

Problems to be Solved by the Invention

The fuel liquid level of the filling-up fuel feed and an allowable fuel amount of the additional fuel feed change as needed by a structure on a vehicle side. In case of the valve device for the fuel tank in the Patent Document 1, in order to correspond to the aforementioned change, at least a component structure of the aforementioned two floats has to be changed.

A main problem to be solved by the present invention is that in this type of valve device, the fuel liquid level of the filling-up fuel feed and the allowable fuel amount of the additional fuel feed can be easily and appropriately changed by replacing only a partial component forming the valve device.

Further objects and advantages of the invention will be apparent from the following description of the invention.

Means to Solve the Invention

In order to obtain the aforementioned object, in the present invention, a valve device for a fuel tank comprises a first valve opening and a second valve opening communicating inside and outside of a fuel tank; a first valve chamber formed below the first valve opening; a second valve chamber formed below the second valve opening, and partitioned from the first valve chamber by a partition wall; a first float disposed inside the first valve chamber to be movable up and down; and a second float disposed inside the second valve chamber to be movable up and down, and the first valve chamber has a structure of positioning an open end below a support portion of the first float and having a passage portion for a fluid. Also, the second valve chamber comprises a support portion of the second float having a passage portion for the fluid, and the first valve chamber and the second valve chamber are formed by fitting a lower-portion comprising the support portion and the open end of the first float and the support portion of the second float relative to an upper-portion comprising the first valve opening and the second valve opening.

According to such valve device, when a fuel liquid level inside the fuel tank reaches the open end of the first valve chamber, the first float rises to close the first valve opening, thereby a fuel liquid level inside a filler pipe (not shown in the drawings) rises by a rise of a pressure inside the fuel tank, and a sensor of a fuel feed gun detects filling-up fuel feed so as to stop fuel feed.

Also, after the fuel feed stops by a detection of the filling-up fuel feed, the pressure inside the fuel tank is reduced by ventilation and the like through the second valve chamber and the second valve opening to lower the fuel liquid level inside the filler pipe so as to allow a certain amount of additional fuel feed.

Also, when a large inclination occurs in a vehicle, the first float and the second float close the first valve opening and the second valve opening so as to prevent the fuel from leaking out of the fuel tank.

Also, in such valve device, without changing a structure of the upper-portion, the lower-portion is replaced so as to change the fuel liquid level inside the fuel tank which is detected as the filling-up fuel feed in the aforementioned manner Namely, when the lower-portion raising a level of the open end of the first valve chamber is combined with the upper-portion, the fuel liquid level inside the fuel tank which is detected as the filling-up fuel feed in the aforementioned manner rises, and when the lower-portion lowering the level of the open end of the first valve chamber is combined with the upper-portion, the fuel liquid level inside the fuel tank which is detected as the filling-up fuel feed in the aforementioned manner goes down.

One of the aspects of the present invention is that a fitted portion of the upper-portion forming the first valve chamber is formed to have an oval shape of an outline in a horizontal cross section, and that when the upper portion and the lower-portion fit together, an outline shape in the horizontal cross section of a fitting portion of the lower-portion which fits in the fitted portion has an oval shape substantially matching with the outline shape of the fitted portion.

Also, one of the aspects of the present invention is that the fitted portion and the fitting portion fit together in an airtight state.

Also, one of the aspects of the present invention is that the fitted portion and the fitting portion fit together in such a way so as to position one of the fitted portion and the fitting portion inside the other of the fitted portion and the fitting portion.

Also, one of the aspects of the present invention is that the upper-portion and the lower-portion are made of synthetic resin, and that both the fitted portion and the fitting portion, or either one of the fitted portion or the fitting portion are/is formed to be thin.

Also, one of the aspects of the present invention is that the first float functions as a valve member of a filling-up fuel-feed detection valve, and that the second float functions as a valve member of a roll-over valve.

In the valve device according to the present invention, the fuel liquid level of the filling-up fuel feed and an allowable fuel amount of the additional fuel feed can be easily and appropriately changed by replacing only the lower-portion forming the valve device.

DETAILED DESCRIPTION OF THE INVENTION

Figure 1:
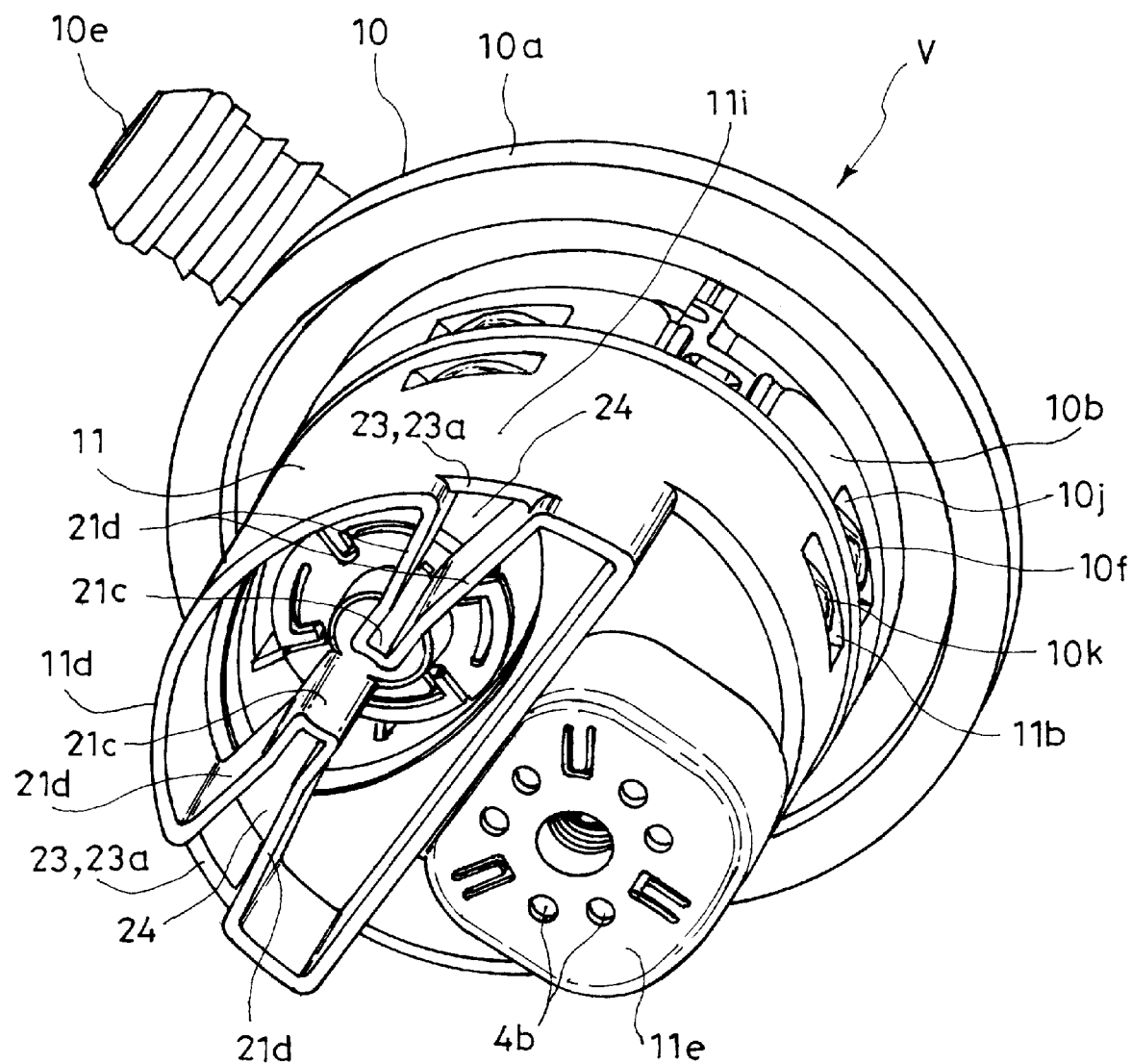
FIG. 1 is a perspective view of a valve device according to one embodiment of the present invention, and shows the valve device viewed from below.

Hereinafter, with reference to FIG. 1 to FIG. 15, a typical embodiment of the present invention will be explained. A valve device V according to the present embodiment is attached to a fuel tank T such as in an automobile, a two-wheel vehicle, and the like so as to form one portion of a ventilation passage of such fuel tank T, and functions for communicating inside and outside of the fuel tank T in an open valve state. Such valve device V is typically attached to an upper portion Ta of the fuel tank T to form one portion of the ventilation passage of the fuel tank T. As shown in an illustrated example, such valve device V can be provided in the fuel tank T using an attachment hole Tb provided in the fuel tank T, or using a bracket and the like (not shown in the drawings) provided inside the fuel tank T, or the like.

The valve device V comprises at least a first valve opening 1 and a second valve opening 2 communicating inside and outside of the fuel tank; a first valve chamber 3 formed below the first valve opening 1; a second valve chamber 4 formed below the second valve opening 2, and partitioned from the first valve chamber 3 by a partition wall 5; a first float 6 disposed inside the first valve chamber 3 to be movable up and down; and a second float 7 disposed inside the second valve chamber 4 to be movable up and down.

The first valve chamber 3 has a structure of positioning an open end 3e below a support portion 3a of the first float 6 having a passage portion 3d for a fluid.

On the other hand, the second valve chamber 4 comprises a support portion 4a of the second float 7 having a passage portion 4b for the fluid at a side slightly upper than the open end 3e of the first valve chamber 3.

The first valve chamber 3 and the second valve chamber 4 are partitioned by the partition wall 5 in an airtight state. The first valve chamber 3 communicates with an outside through the first valve opening 1, and the second valve chamber 4 communicates with the outside through the second valve opening 2. The first valve chamber 3 communicates with a space at a side upper than a fuel liquid level inside the fuel tank T through the open end 3e and the later-described upper-portion orifices 9, and the second valve chamber 4 communicates with the space at the side upper than the fuel liquid level inside the fuel tank T through the passage portion 4b of the support portion 4a and the later-described ventilation window hole 8.

According to such valve device V, when the fuel level (liquid level) inside the fuel tank T reaches the open end 3e of the first valve chamber 3 (a level shown by a symbol L1 in FIG. 4), a rise of an internal pressure of the fuel tank T, and an inflow of the fuel into the first valve chamber 3 accompanied by the rise of the internal pressure of the fuel tank T can be made. Thereby, the first float 6 rises to close the first valve opening 1, and by the rise of the internal pressure of the fuel tank T, the fuel level inside a filler pipe (not shown in the drawings) rises, and a sensor of a fuel feed gun (fuel feed nozzle) (not shown in the drawings) detects filling-up fuel feed so as to stop fuel feed (a detection of the first filling-up fuel feed).

Also, after the fuel feed stops by the detection of the first filling-up fuel feed, the internal pressure of the fuel tank T can be reduced by a ventilation through the second valve chamber 4 and the second valve opening 2.

In the illustrated example, in a side portion of the second valve chamber 4 and above the support portion 4a, there is formed the ventilation window hole 8, and after the fuel feed stops, the ventilation is carried out mainly through the ventilation window hole 8 and the second valve opening 2.

Also, in the illustrated example, in a side portion of the first valve chamber 3 and above the support portion 3a, there are formed the upper-portion orifices 9, and after the fuel feed stops, by the ventilation through the upper-portion orifices 9 and a gap between the later-described flange-forming member 10a and a trunk member 10b, the internal pressure of the first valve chamber 3 is reduced, and the fuel level inside the first valve chamber 3 is lowered, so that the first float 6 descends so as to open the first valve opening 1.

Thereby, the fuel level inside the filler pipe is lowered so as to allow additional fuel feed. In the present embodiment, the first valve chamber 3 includes the later-described orifices 22 and orifice-ventilation passages 24, and entrances 24a of the orifice-ventilation passages 24 are positioned at a side lower than the support portion 3a and at a side upper than the open end 3e of the first valve chamber 3 by notch portions 23 formed in the open end 3e of the first valve chamber 3 so as to allow the additional fuel feed until the fuel liquid level inside the fuel tank T reaches the entrances 24a of the orifice-ventilation passages 24. By the additional fuel feed, when the fuel liquid level inside the fuel tank T reaches the entrances 24a of the orifice-ventilation passages 24 (a level shown by a symbol L2 in FIG. 4), the rise of the internal pressure of the fuel tank T and the inflow of the fuel into the first valve chamber 3 occur again, and the sensor of the fuel feed gun detects the filling-up fuel feed again so as to stop the fuel feed (a detection of a second filling-up fuel feed).

Also, when a large inclination or the like occurs in a vehicle, the first float 6 and the second float 7 close the first valve opening 1 and the second valve opening 2 so as to prevent the fuel from leaking out of the fuel tank T.

Namely, the first float 6 functions as a valve member of a filling-up fuel-feed detection valve, and the second float 7 functions as a valve member of a roll-over valve.

Also, in the valve device V, the first valve chamber 3 and the second valve chamber 4 are formed such that a lower-portion part 11 comprising the support portion 3a and the open end 3e of the first float 6, and the support portion 4a of the second float 7 fits relative to a device-upper portion 10 comprising the first valve opening 1 and the second valve opening 2.

Thereby, in such valve device V, without changing a structure of the device-upper portion 10, the lower-portion part 11 is replaced so as to change the fuel liquid level inside the fuel tank T which is detected as the filling-up fuel feed in the aforementioned manner Namely, when the lower-portion part 11 for raising a level of the open end 3e of the first valve chamber 3 is combined with the device-upper portion 10, the fuel liquid level inside the fuel tank T which is detected as the filling-up fuel feed in the aforementioned manner rises, and when the lower-portion part 11 for lowering the level of the open end 3e of the first valve chamber 3 is combined with the device-upper portion 10, the fuel liquid level inside the fuel tank T which is detected as the filling-up fuel feed in the aforementioned manner goes down.

The device-upper portion 10 is formed by combining the flange-forming member 10a and the trunk member 10b.

The flange-forming member 10a has a structure wherein an outer flange 10d is formed between an upper end and a lower end of a cylindrical member 10c closing the upper end and opening at the lower end. Between the upper end and the outer flange 10d, there is formed a connecting pipe portion 10e extending laterally by communicating one pipe end thereof with a space inside the flange-forming member 10a.

The trunk member 10b has a structure of forming a transverse partition wall 10h at an upper end of a cylindrical member 10g having an outer diameter substantially equal to an inner diameter of the flange-forming member 10a, and comprising a longitudinal partition wall 5a which becomes the partition wall 5 dividing an inside of the trunk member 10b into two along between the transverse partition wall 10h and a lower end.

On one side sandwiching a center of the transverse partition wall 10h, there is formed the first valve opening 1, and on the other side sandwiching the center of the transverse partition wall 10h, there is formed the second valve opening 2.

In the illustrated example, the first valve opening 1 has a circular hole passing through the transverse partition wall 10h up and down.

On the other hand, in the illustrated example, the second valve opening 2 is formed at a lower end of an enlarged portion 12 projecting downwardly from a lower face of the transverse partition wall 10h. On an upper side of the second valve opening 2, there is formed a storage chamber 13 for a valve member 14 which becomes a check valve. The valve member 14 forming the check valve is formed by a shaft-shaped inside valve member 14a and a tubular outside valve member 14b. The outside valve member 14b is pressed against a circular step face 13a upwardly formed in a position of an approximately middle in an up-and-down direction of the storage chamber 13 from above by an urging force of a spring shown by the reference numeral 15 in the drawings. On the other hand, the inside valve member 14a is pressed against a lower-end opening edge 14c of the outside valve member 14b from below by an urging force of a spring shown by the reference numeral 16 in the drawings.

In the illustrated example, when the inside of the fuel tank T comes to have a predetermined high pressure, the outside valve member 14b moves upwardly to release a seal of the circular step face 13a so as to discharge a gas inside the fuel tank T to the outside of the fuel tank T through the second valve opening 2. Also, when the inside of the fuel tank T comes to have a predetermined low pressure, the inside valve member 14a moves downwardly to release a seal of the lower-end opening edge 14c of the outside valve member 14b so as to send an outside air into the fuel tank T through the second valve opening 2.

Figure 2:
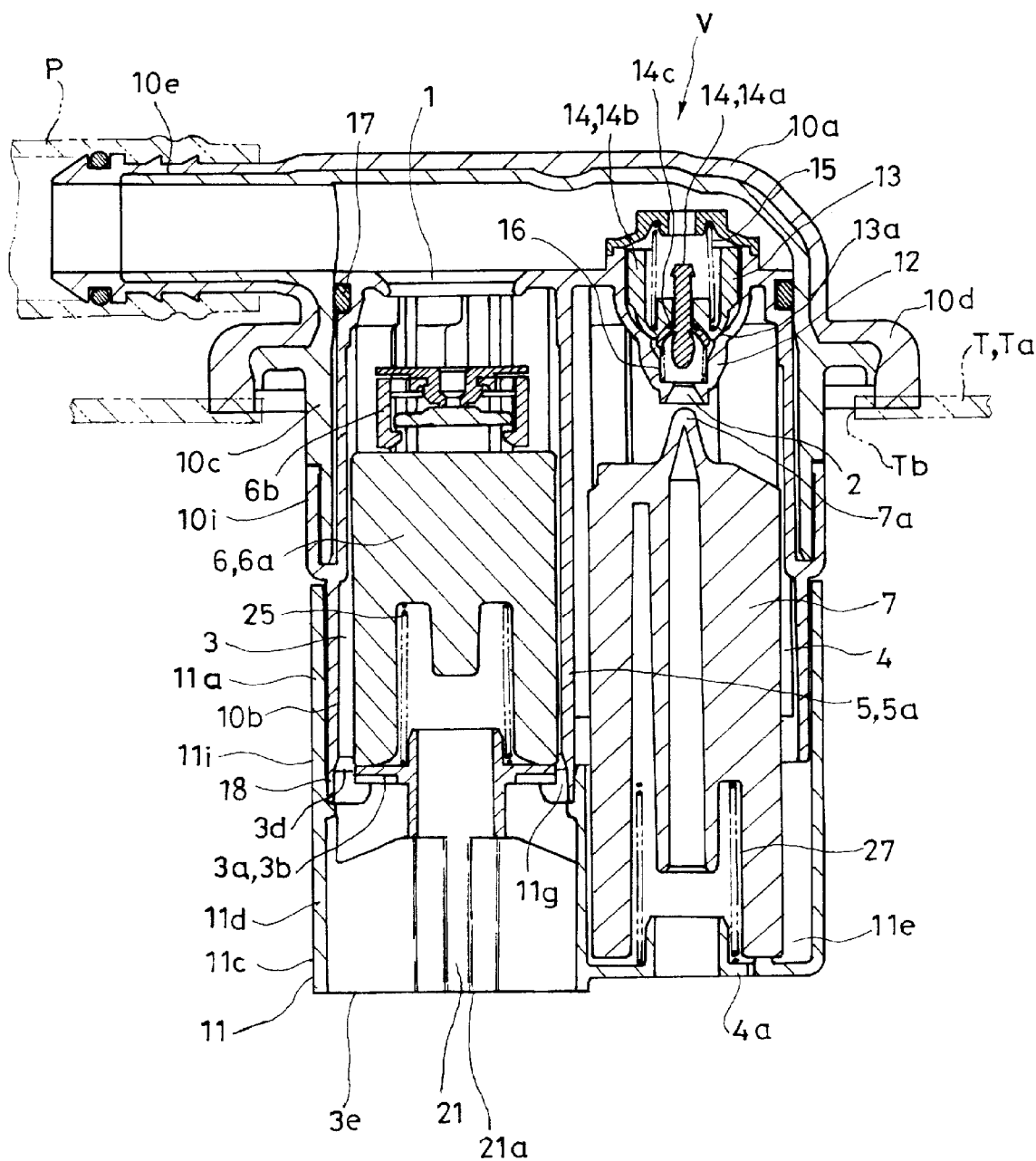
FIG. 2 is a cross-sectional view of the valve device, and shows an upper portion of a fuel tank, and a pipe to be connected to the valve device by imaginary lines.
Figure 7:
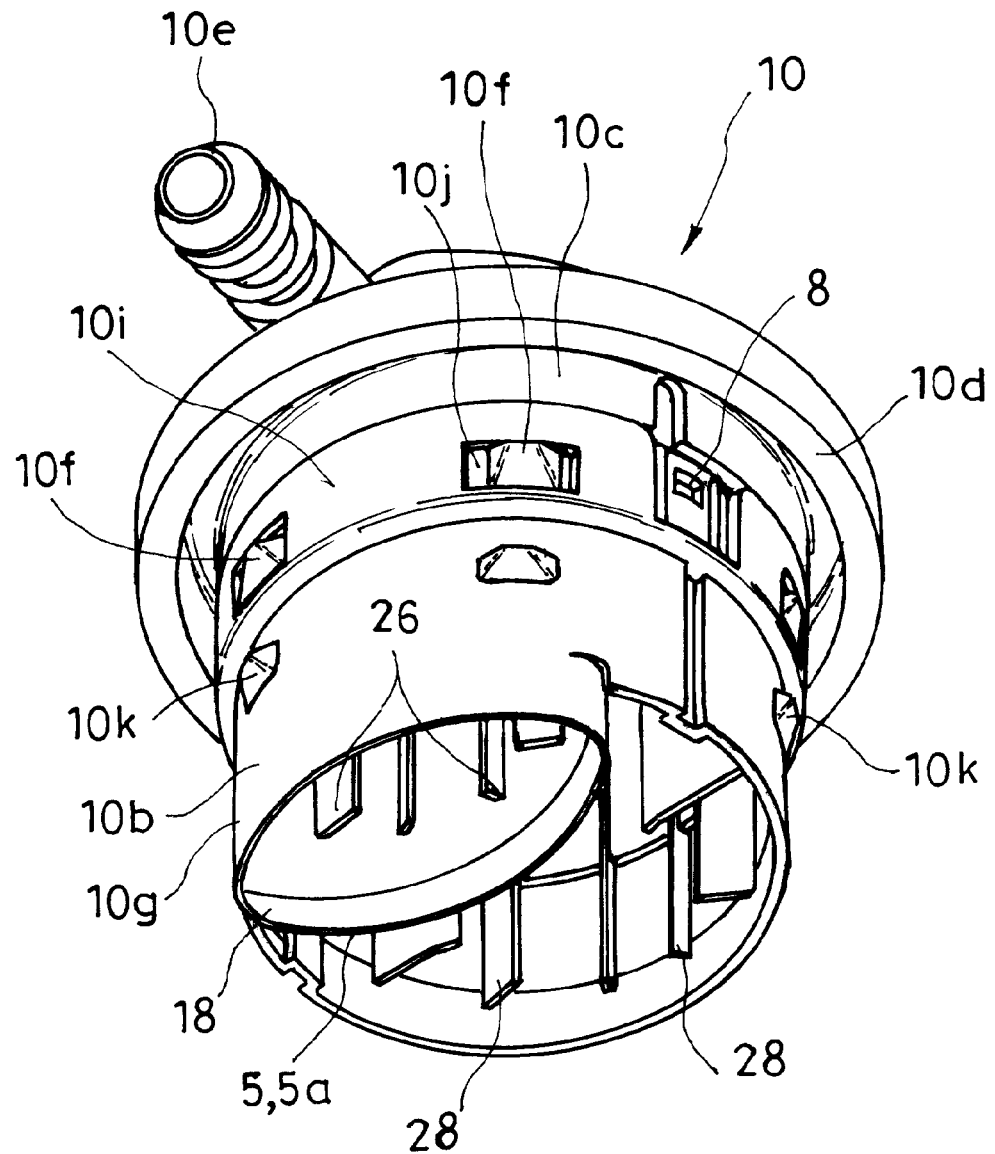
FIG. 7 is a perspective view of a device-upper portion forming the valve device.
Figure 8:
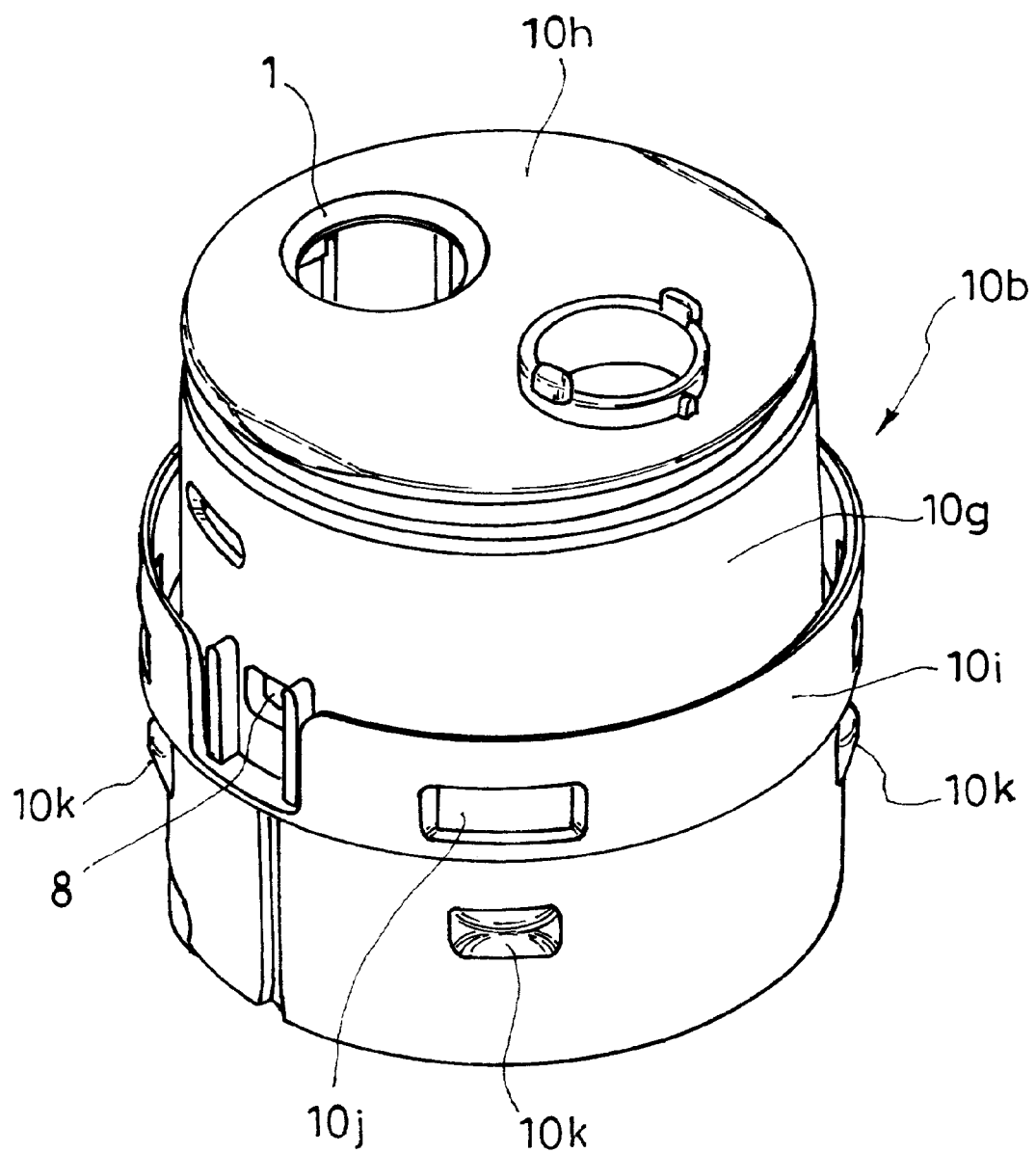
FIG. 8 is a perspective view of the trunk member forming the valve device.

An outer diameter of the trunk member 10b is substantially equal to an inner diameter of the cylindrical member 10c of the flange-forming member 10a. On an outside of the trunk member 10b, there is formed an outside wall 10i forming a gap to house a lower end side of the flange-forming member 10a, and engagement projections 10f shown by the symbol 10f in the drawings and formed on an outside of the cylindrical member 10c engage window holes 10j on the outside wall 10i, so that the flange-forming member 10a and the trunk member 10b are combined (FIG. 7). In this combined state, an internal space of the flange-forming member 10a and an internal space of the trunk member 10b communicate only through the first valve opening 1 and the second valve opening 2. In FIG. 2, the reference numeral 17 represents a seal ring between an inner face of the flange-forming member 10a and an outer face of the trunk member 10b.

In the illustrated example, a portion positioned in a side lower than the outer flange 10d of the flange-forming member 10a is housed in the attachment hole Tb formed in the fuel tank T, and the outer flange 10d is welded to an outer face portion of the fuel tank T so as to attach the valve device V to the fuel tank T. The connecting pipe portion 10e is inserted into a pipe P forming the ventilation passage, thereby the inside and outside of the fuel tank T are communicated through the valve device V (FIG. 2).

Figure 11:
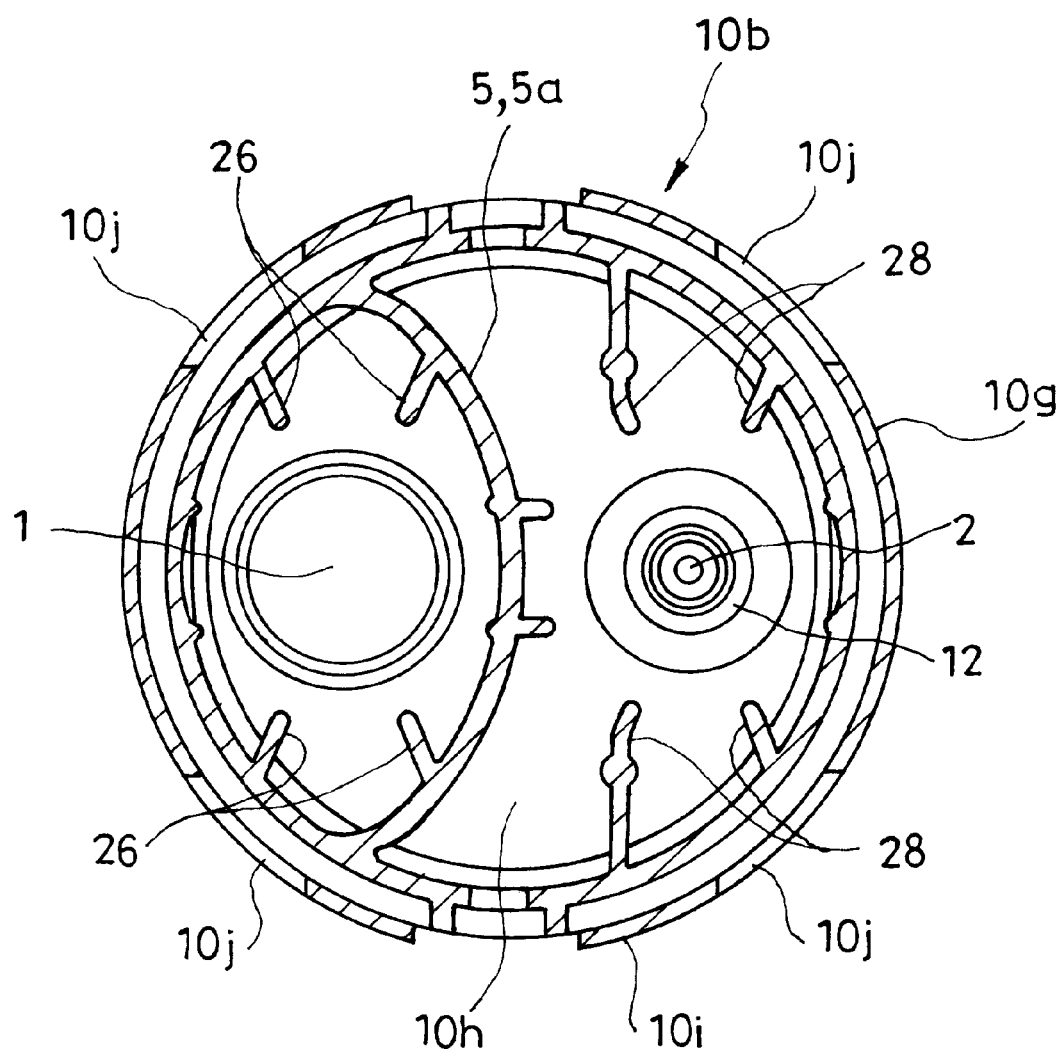
FIG. 11 is a cross-sectional view taken along a line C-C in FIG. 10.
Figure 12:
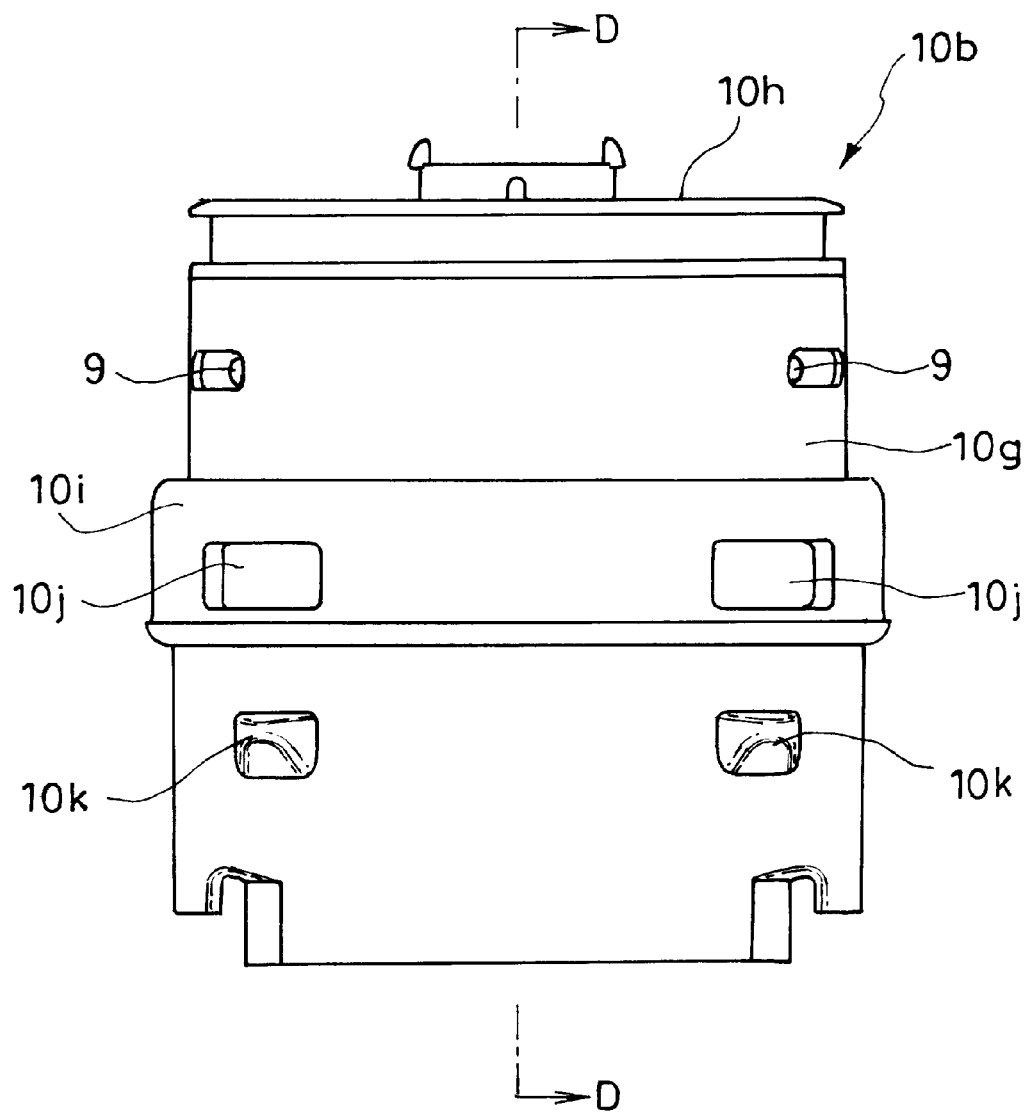
FIG. 12 is a side view of the trunk member forming the valve device.
Figure 13:
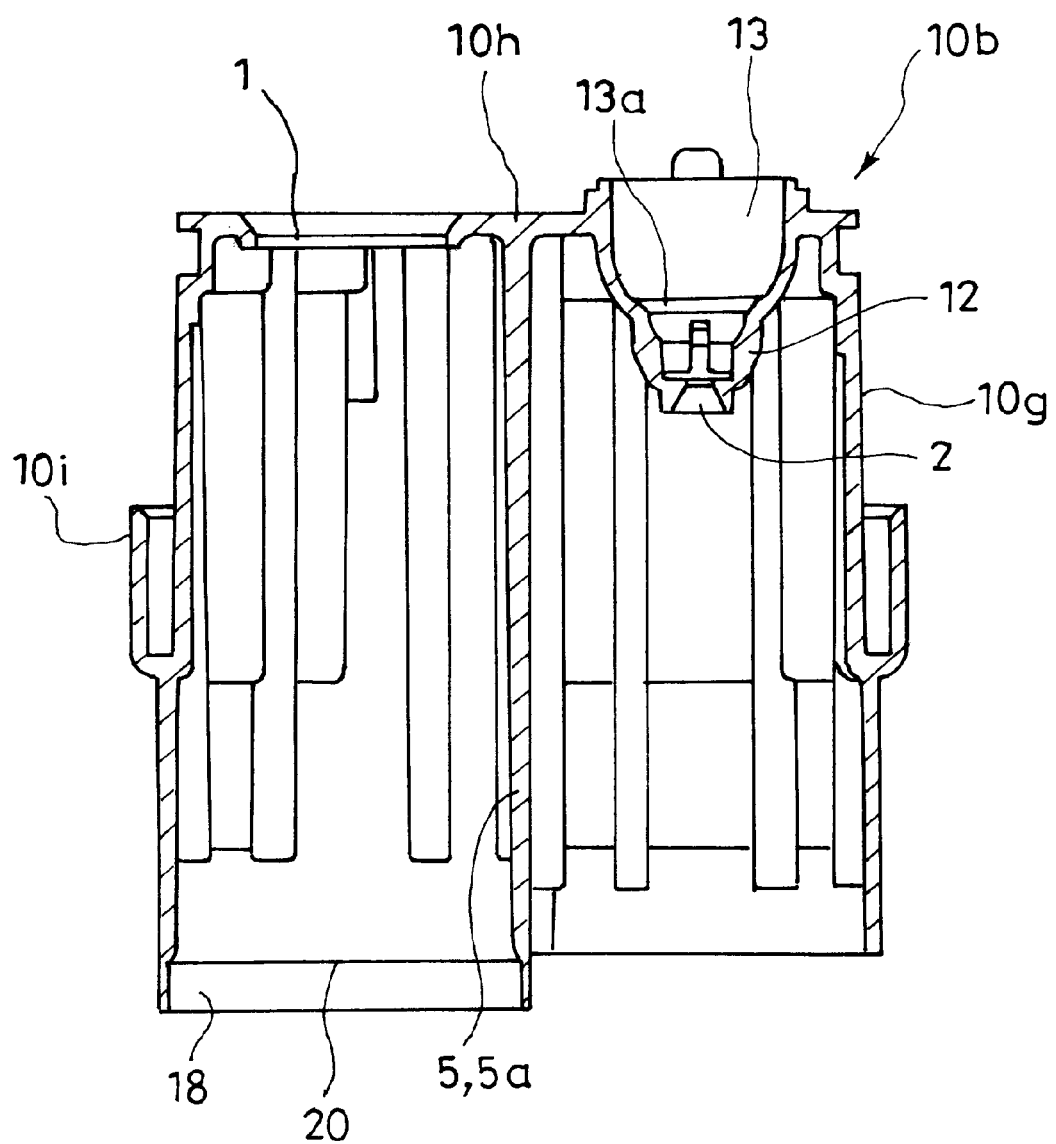
FIG. 13 is a cross-sectional view taken along a line D-D in FIG. 12.

The longitudinal partition wall 5a has a structure formed on one side sandwiching a virtual vertical surface S (see FIG. 3) dividing the trunk member 10b into two right and left parts, and forming a space which becomes the first valve chamber 3 having an oval shape of an outline shape in horizontal cross section between the longitudinal partition wall 5a and a side face of the trunk member 10b positioned in the one side. Namely, the longitudinal partition wall 5a has a structure having a curve wherein the other side sandwiching the virtual vertical surface S is a curve outside (FIG. 7, FIG. 9, and FIG. 11).

On the curve outside the longitudinal partition wall 5a in the trunk member 10b, there is formed a space which becomes the second valve chamber 4. The space which becomes the second valve chamber 4 has a crescent shape on an outline in horizontal cross section (FIG. 7, FIG. 9, and FIG. 11).

Figure 9:
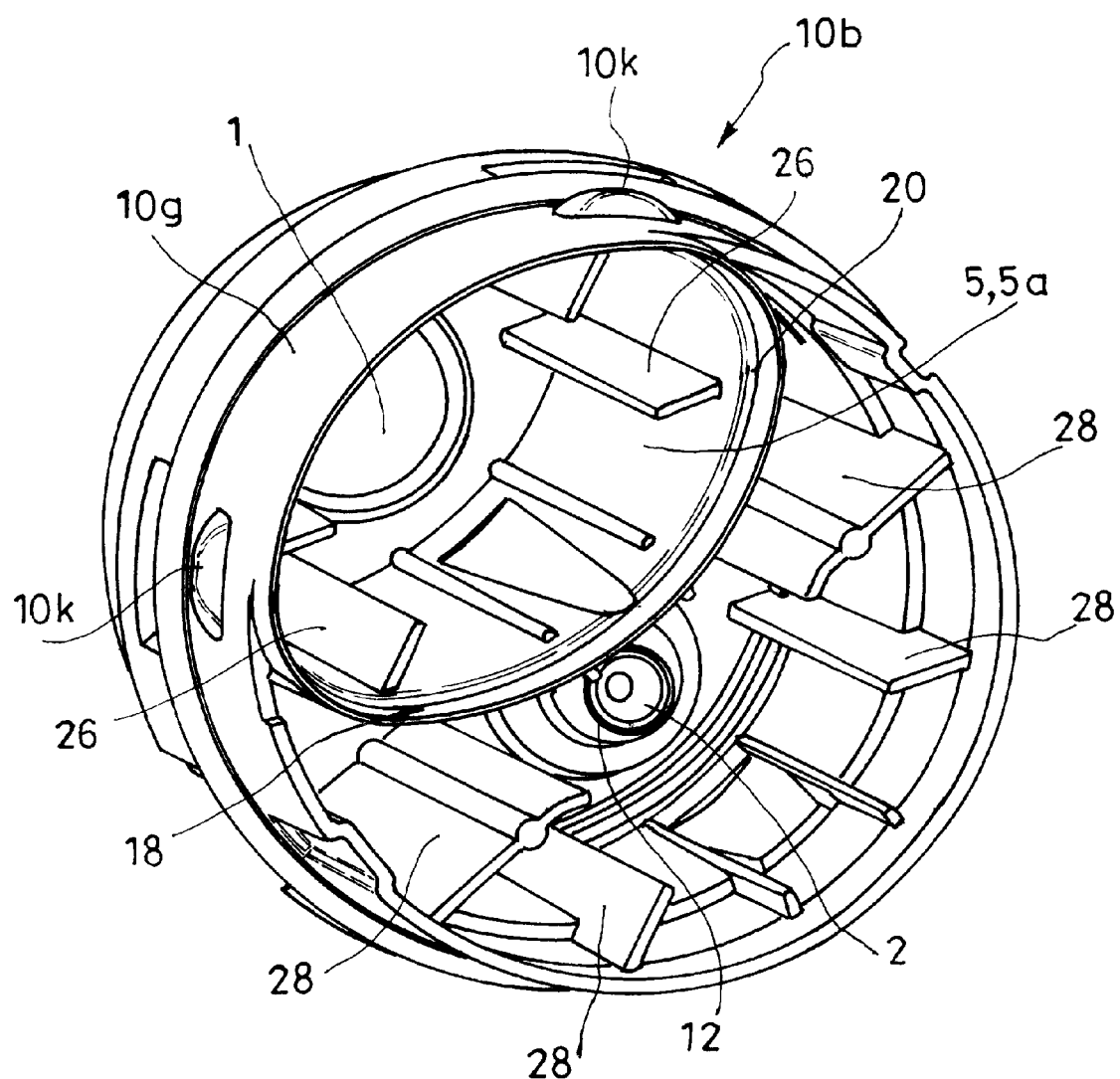
FIG. 9 is a perspective view of the trunk member forming the valve device.
Figure 10:
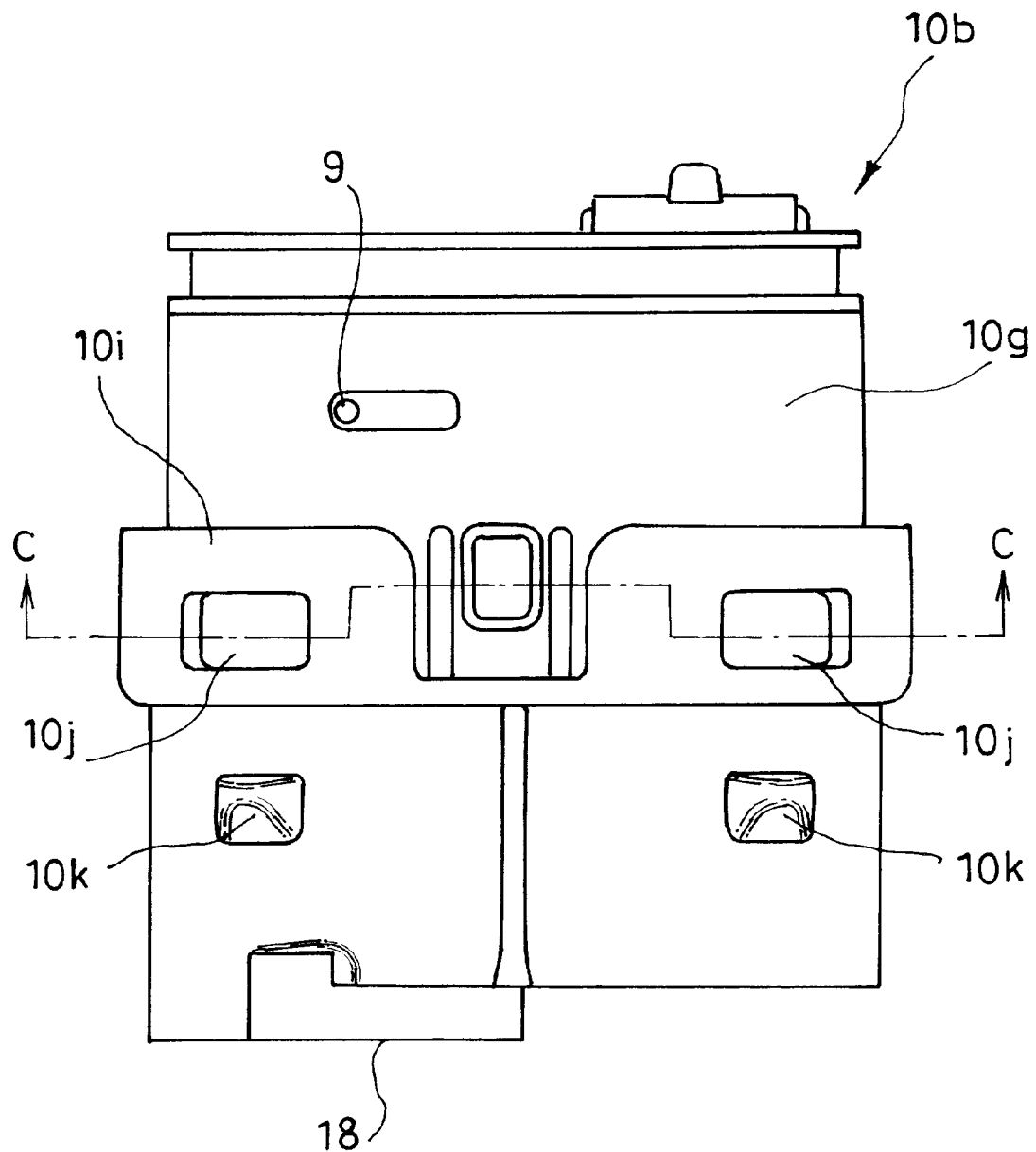
FIG. 10 is a side view of the trunk member forming the valve device.

In the present embodiment, lower ends of the longitudinal partition wall 5a and one portion of the trunk member 10b forming the space which becomes the first valve chamber 3 project downwardly more than the lower end of the trunk member 10b forming the space which becomes the second valve chamber 4 (FIG. 7 and FIG. 9).

On the other hand, the lower-portion part 11 is formed to have a cylindrical shape at an upper side of the support portion 3a of the first float 6, and to comprise a skirt portion 11d and the support portion 4a of the second float 7 at a lower side of the support portion 3a.

In an upper-side portion 11a which becomes an upper side of the support portion 3a of the first float 6 in the lower-portion part 11, an inner diameter thereof is substantially equal to the outer diameter of the trunk member 10b of the device-upper portion 10. In the illustrated example, by engaging engagement projections shown by the symbol 10k in the drawings and formed on an outside of the trunk member 10b with window holes 11b formed in the upper-side portion 11a of the lower-portion part 11, the device-upper portion 10 and the lower-portion part 11 are combined (see FIG. 1).

A lower-side portion 11c which becomes the lower side of the support portion 3a of the first float 6 in the lower-portion part 11 becomes the skirt portion 11d having a substantially semicircular shape on an outline in horizontal cross section in one side along the virtual vertical surface S (see FIG. 3) dividing the lower-portion part 11 into two right and left parts.

Also, the lower-side portion 11c in the lower-portion part 11 becomes a rectangular cylindrical storage portion 11e for the second float 7 having a substantially square shape on an outline in horizontal cross section in the other side along the virtual vertical surface S dividing the lower-portion part 11 into two right and left parts.

A lower end of the skirt portion 11d functions as the open end 3e. Also, a transverse plate portion covering a lower end of the rectangular cylindrical storage portion 11e functions as the support portion 4a of the second float 7.

Figure 15:
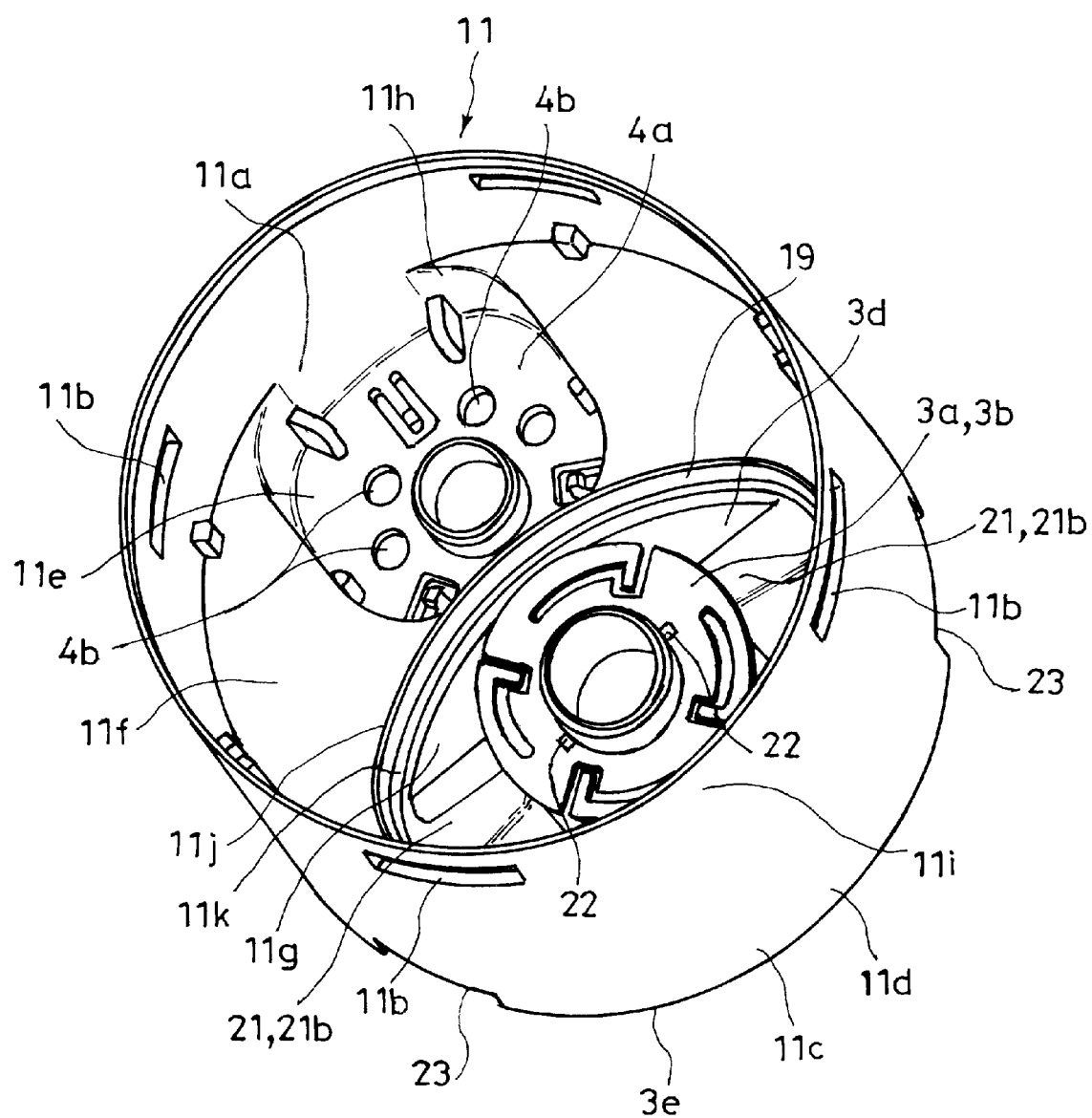
FIG. 15 is a perspective view of the lower-portion part forming the valve device.

In the illustrated example, in a transverse partition wall 11f partitioning between the upper-side portion 11a and the lower-side portion 11c of the lower-portion part 11, there is formed an oval through hole 11g in one side sandwiching the virtual vertical surface S, and in the other side sandwiching the virtual vertical surface S, there is formed a square through hole 11a having a substantially square shape communicating with the rectangular cylindrical storage portion 11e (FIG. 15).

Figure 14:
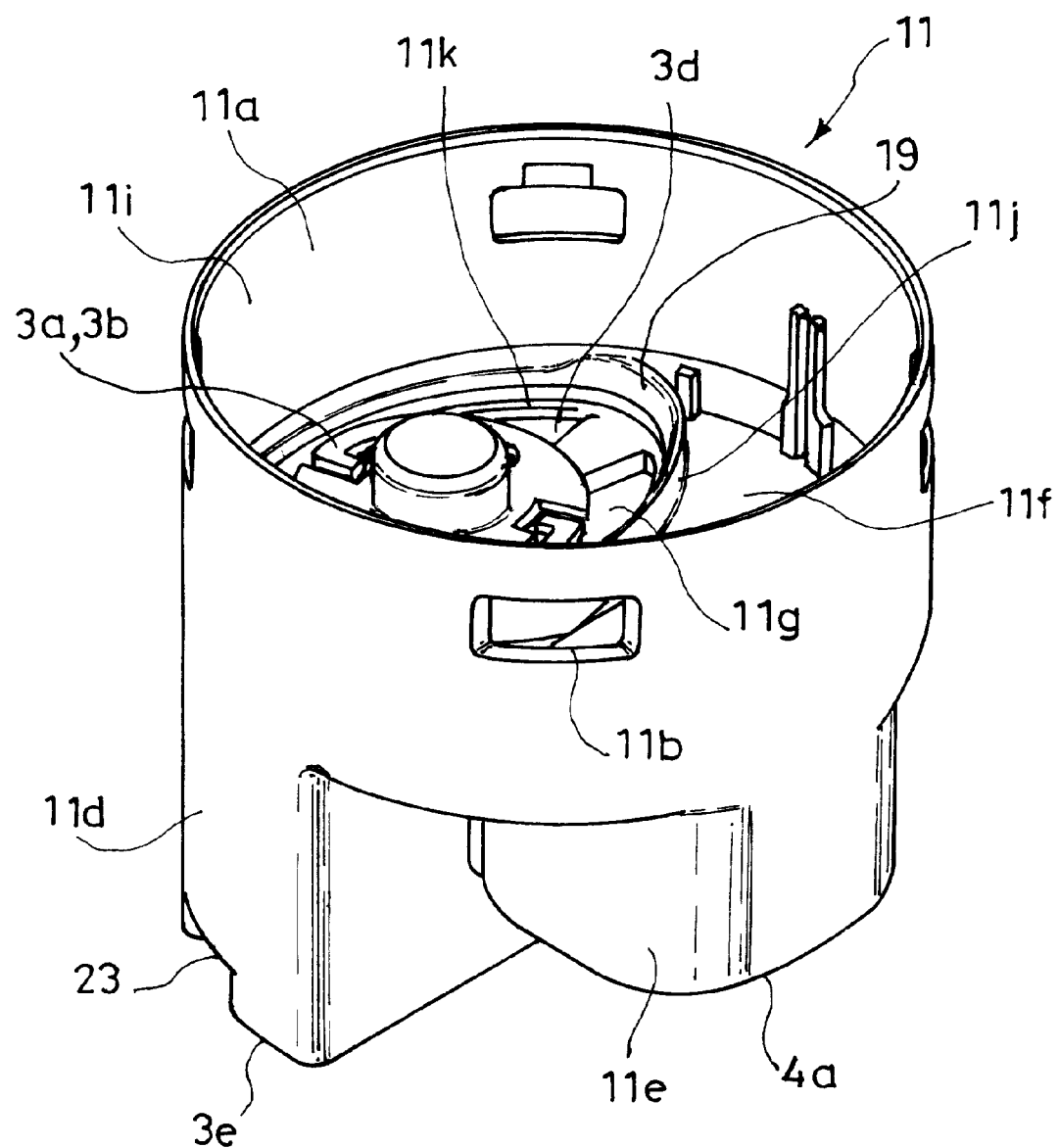
FIG. 14 is a perspective view of a lower-portion part forming the valve device.

The oval through hole 11g has a structure of forming the space which becomes the first valve chamber 3. Substantially half of the oval through hole 11g is formed by a side face 11i of the lower-portion part 11. A portion which becomes half of the remaining oval through hole 11g is bordered by a rising portion 11j on an upper face side of the transverse partition wall 11f (FIG. 14 and FIG. 15). Also, in a hole edge portion of the oval through hole 11g, there is formed an upward step face 11k along a circumference direction surrounding a center of the oval through hole 11g at a portion which becomes a side slightly lower than the rising portion 11j.

In the present embodiment, when the lower-portion part 11 is combined with the device-upper portion 10 in the aforementioned manner, the longitudinal partition wall 5a and a lower end (hereinafter, the lower end thereof will be called a fitted portion 18) of one portion of the trunk member 10b forming the space which becomes the first valve chamber 3 in the trunk member 10b of the device-upper portion 10 fit into the side face 11i and the rising portion 11j (hereinafter, those will be called a fitting portion 19) of the lower-portion part 11 surrounding the oval through hole 11g of the lower-portion part 11, so that the first valve chamber 3 and the second valve chamber 4 are formed in a state sealed between both the chambers in an airtight manner.

Namely, in the present embodiment, the fitted portion 18 of the device-upper portion 10 forming the first valve chamber 3 is formed to have an oval shape on an outline in horizontal cross section, and when the device-upper portion 10 and the lower-portion part 11 fit together, an outline shape in horizontal cross section of the fitting portion 19 of the lower-portion part 11 which fits into the fitted portion 18 has an oval shape substantially matching the outline shape of the fitted portion 18.

In a case wherein the outline shapes in horizontal cross section of the fitting portion 19 and the fitted portion 18 have a straight-line portion, without highly securing a dimensional accuracy of both the portions, when both the portions fit together, there can be easily generated a portion which is difficult to apply a certain level of fitting force between both portions. On the other hand, in the present embodiment, the outline shapes in horizontal cross section of the fitting portion 19 and the fitted portion 18 have the oval shapes, so that when both portions fit together, at each position surrounding the center of the oval shape, both portions can tightly contact with each other by the certain amount of fitting force as much as possible. Thereby, in the present embodiment, only by simply combining the device-upper portion 10 and the lower-portion part 11, without requiring the seal ring, welding, and the like, the first valve chamber 3 and the second valve chamber 4 can be adequately formed by the device-upper portion 10 and the lower-portion part 11 in a state wherein there is almost no ventilation between the first valve chamber 3 and the second valve chamber 4. Therewith, by doing that, a cross-sectional area of the first valve chamber 3 formed inside the valve device V having a substantially circular shape of the outline shape in horizontal cross section can be maximized.

Namely, in the present embodiment, the fitted portion 18 and the fitting portion 19 fit together in the airtight state. Incidentally, the airtight state in the present specification means that there is no ventilation with a level impairing a function of the valve device V between the first valve chamber 3 and the second valve chamber 4, and does not mean a complete airtight state.

Also, in the present embodiment, the fitted portion 18 and the fitting portion 19 fit together in such a way so as to position one of the fitted portion 18 and the fitting portion 19 on the inner side of the other of the fitted portion 18 and the fitting portion 19.

Also, in the present embodiment, the device-upper portion 10 and the lower-portion part 11 are made of synthetic resin, and both the fitted portion 18 and the fitting portion 19, or either one of the fitted portion 18 or the fitting portion 19 are/is formed to be thin. In the illustrated example, the fitted portion 18 is formed to be thin in such a way so as to form a step 20 inside the first valve chamber 3 between the fitted portion 18 and an inner face of the trunk member 10b which is located above the fitted portion 18 (see FIG. 9). Thereby, when the fitted portion 18 and the fitting portion 19 fit together, a fitted portion 18 side is easily elastically deformed, and compared to another portion, a fit portion is formed so as to become thin as little as possible.

Inside the oval through hole 11g formed in the transverse partition wall 10h of the lower-portion part 11, there is formed the support portion 3a of the first float 6.

In the illustrated example, the support portion 3a of the first float 6 is formed by including a disk-shaped member 3b disposed at a center of the oval through hole 11g. Such disk-shaped member 3b is supported by supporting column portions 21 formed inside the lower-portion part 11 in such a way so as to be positioned directly below a bottom portion of the first float 6.

The supporting column portions 21 project toward a center side of the oval through hole 11g from an inner side of the skirt portion 11d of the lower-portion part 11. The supporting column portions 21 are formed along an up-and-down direction of the skirt portion 11d. Also, an inside of the supporting column portions 21 is hollow. Also, a lower end 21a of each supporting column portion 21 is open, and an upper end 21b of the supporting column portion 21 is closed.

Figure 3:
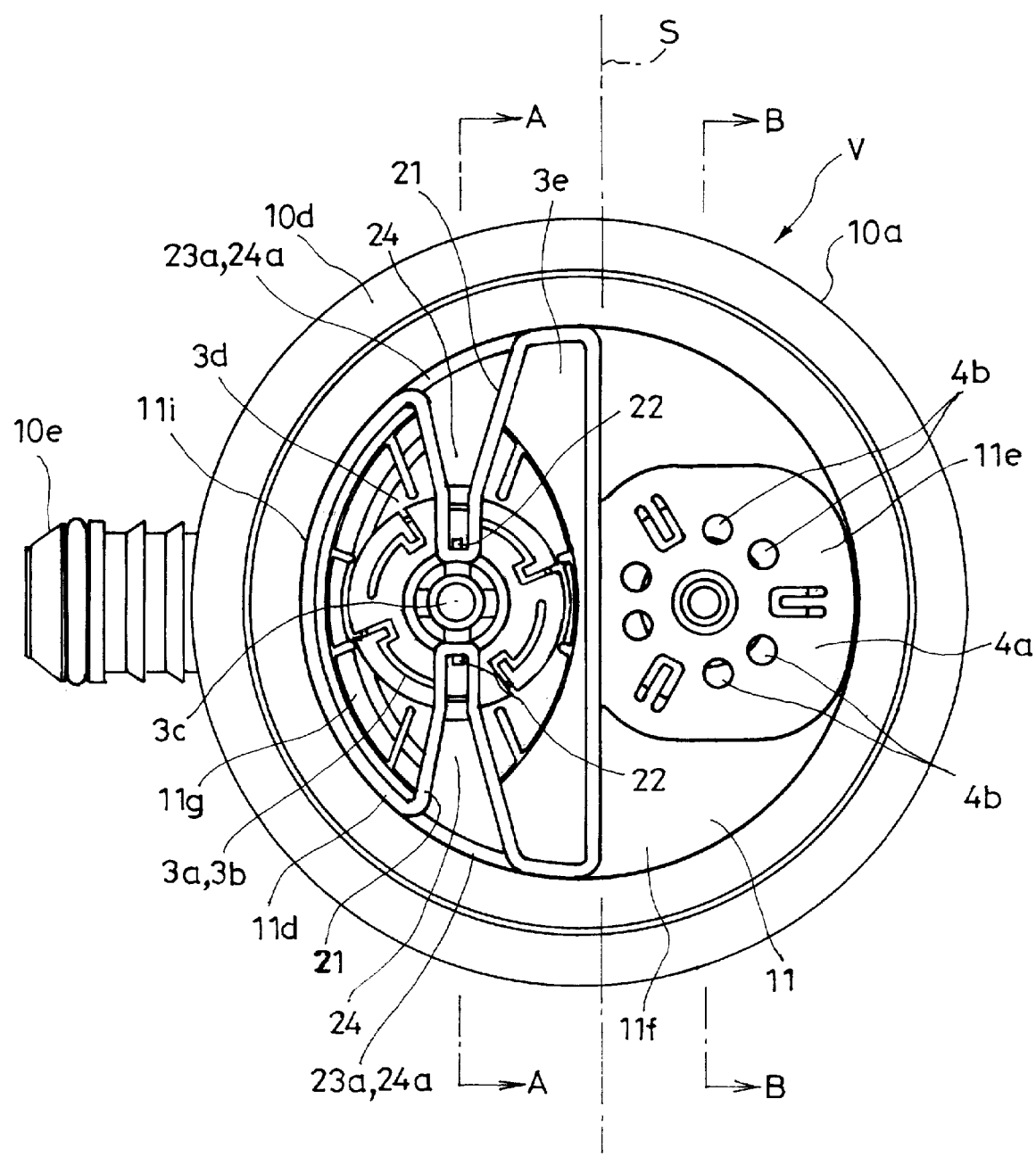
FIG. 3 is a bottom view of the valve device.
Figure 4:
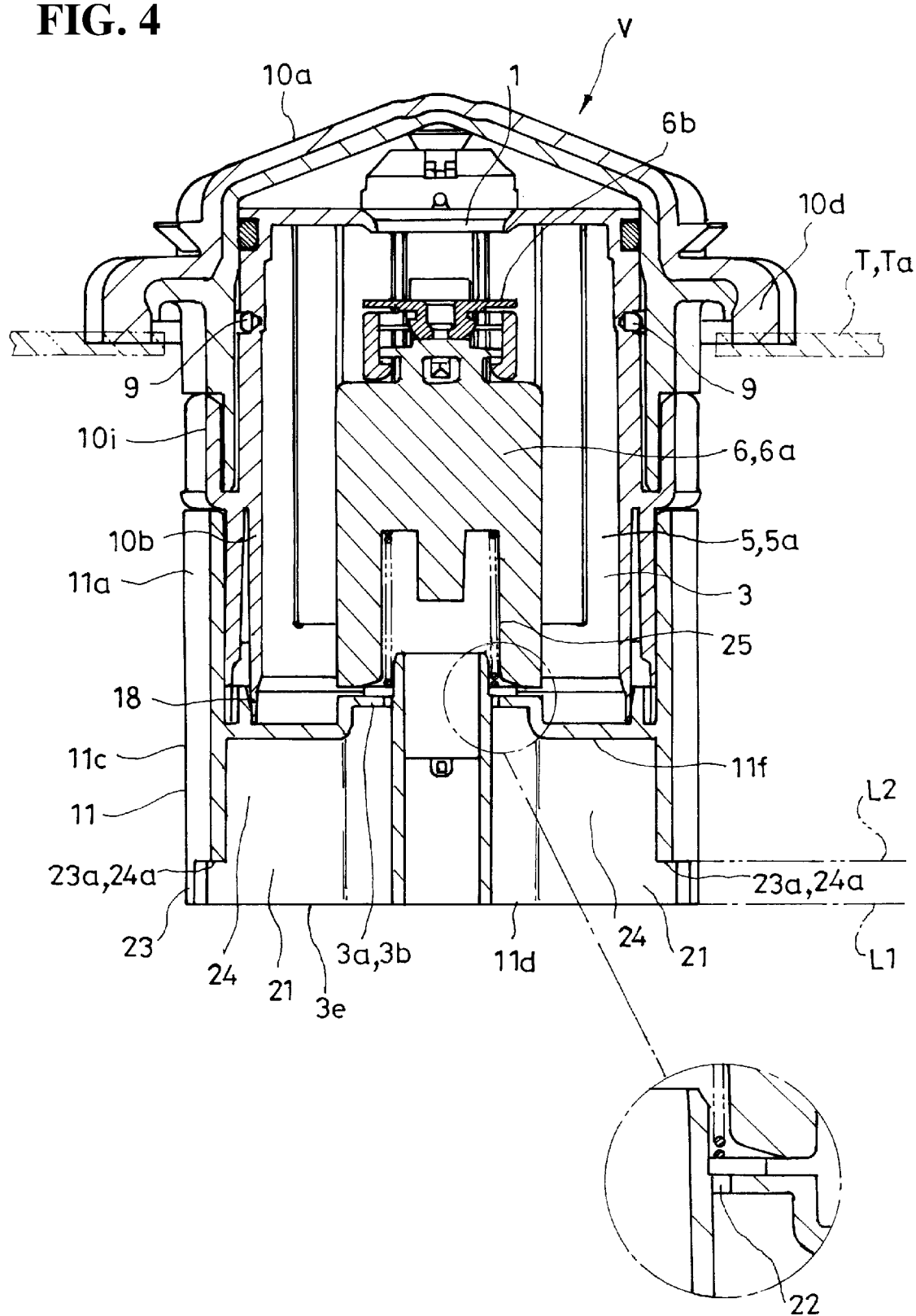
FIG. 4 is a cross-sectional view taken along a line A-A in FIG. 3.
Figure 5:
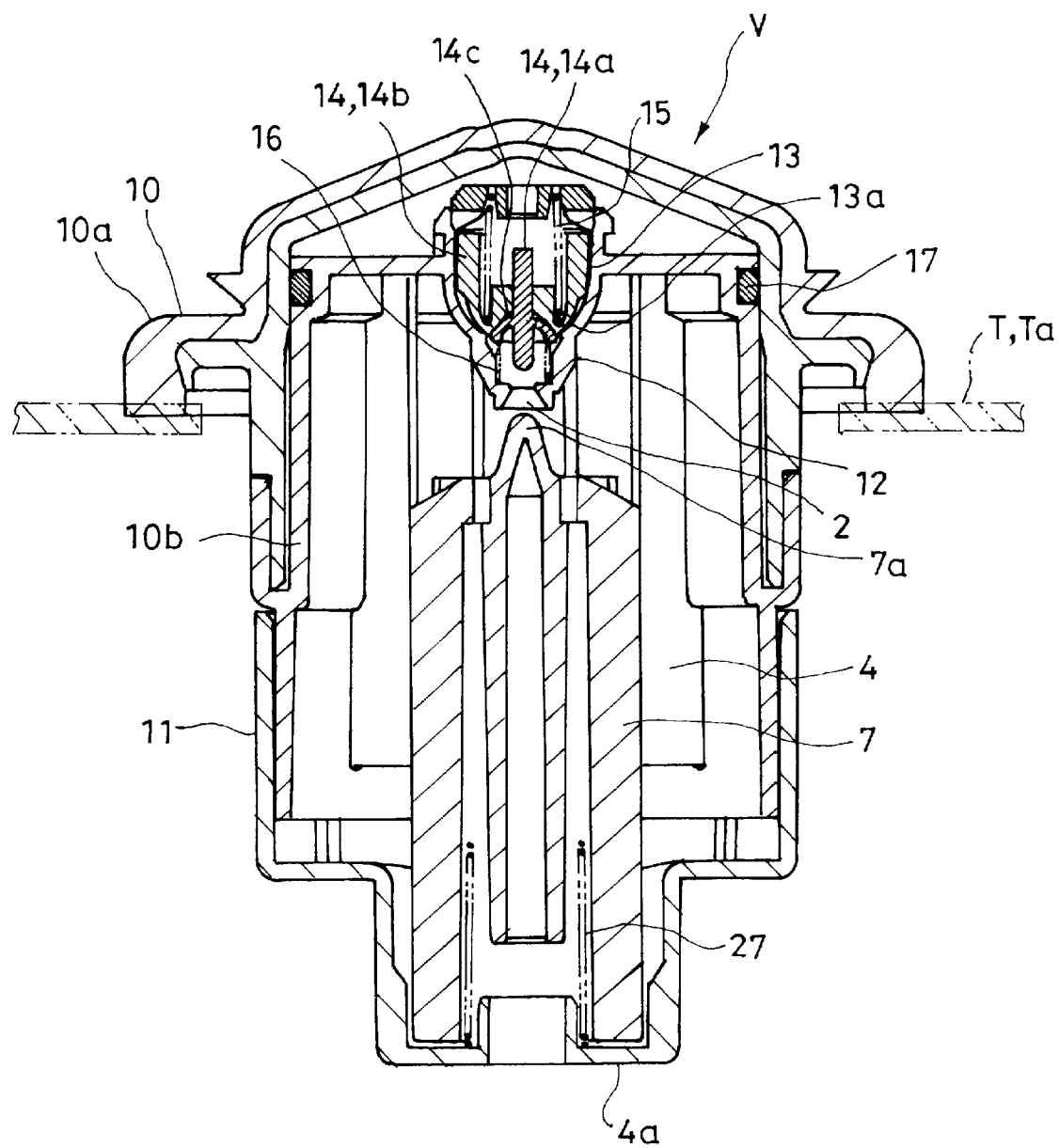
FIG. 5 is a cross-sectional view taken along a line B-B in FIG. 3.
Figure 6:
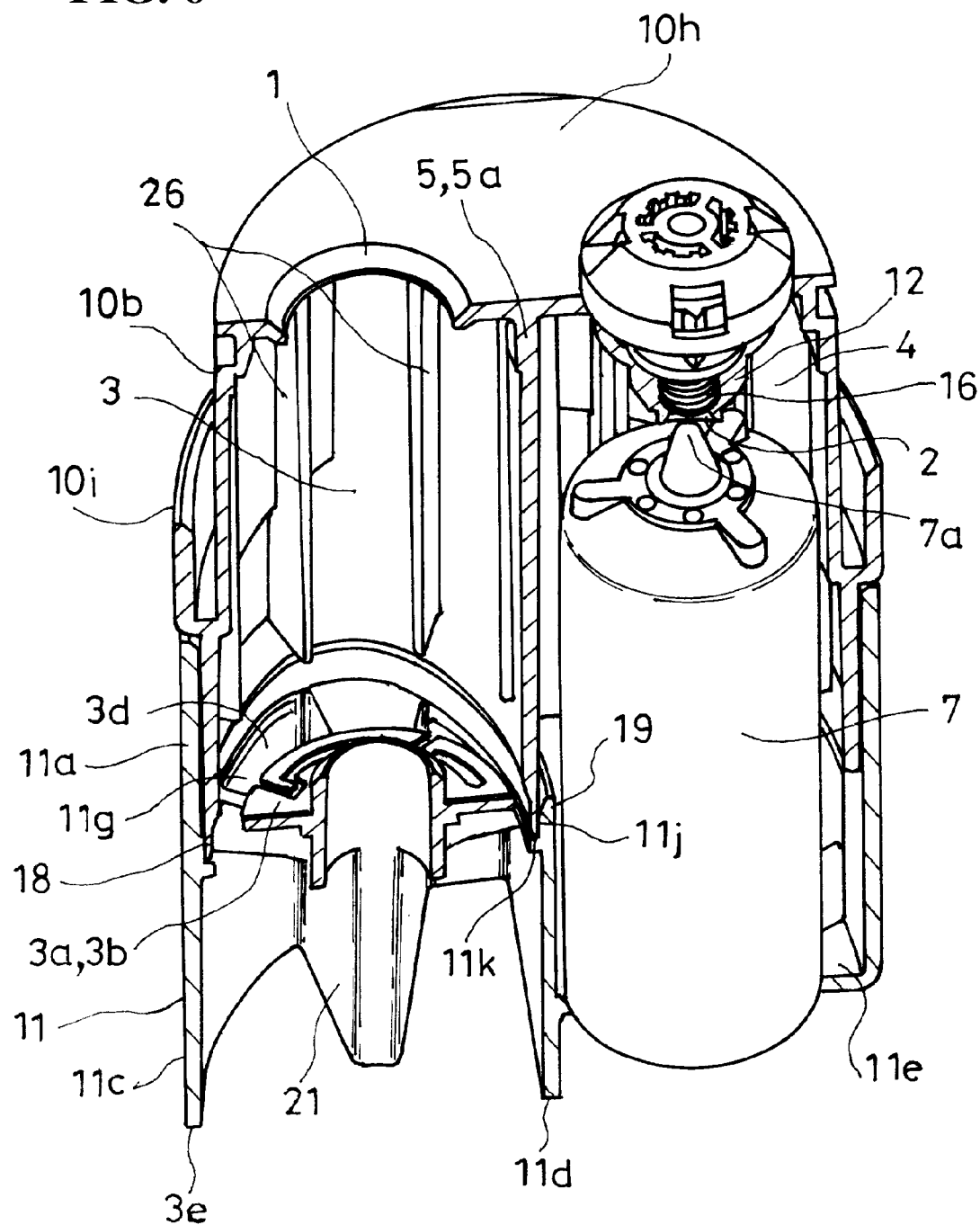
FIG. 6 is a partially cut perspective view of essential parts of a trunk member forming the valve device, and a first float is omitted.

In the illustrated example, the supporting column portion 21 is formed in such a way so as to project toward the center of the oval through hole 11g respectively from a portion facing a short shaft of the oval through hole 11a in the skirt portion 11d (see FIG. 3). In the illustrated example, in a state wherein the skirt portion 11d is located in horizontal cross section, the supporting column portion 21 is formed in such a way so as to have a substantially same outline shape at any position along the up-and-down direction, and is formed by the side face 11i of the lower-portion part 11; a wall face 21c positioned on the center side of the oval through hole 11g facing the side face 11i; and two wall faces 21d formed to be elongated between the wall face 21c and the side face 11i, and forming a space having a flat square shape gradually decreasing as approaching the center side of the oval through hole 11g.

The disk-shaped member 3b is supported like a floating island at the center of the oval through hole 11g by a pair of supporting column portions 21 by integrating a lower face of the disk-shaped member 3b with the upper end 21b positioned in the center side of the oval through hole 11g of the pair of supporting column portions 21. A gap formed between the oval through hole 11g and the disk-shaped member 3b functions as the passage portion 3d for the fluid of the support portion 3a of the first float 6.

In the disk-shaped member 3b, there are formed the orifices 22 communicating with the inside of the supporting column portions 21. On the other hand, although the lower end 21a of each supporting column portion 21 corresponds to the open end 3e of the skirt portion 11d on the inner side of the skirt portion 11d (lower ends of the wall faces 21c and 21d), on an outside of the skirt portion 11d, the lower end 21a of each supporting column portion 21 is positioned at a side slightly upper than the open end 3e of the skirt portion 11d by the notch portion 23 cut at one portion of an outer shell (the side face 11i of the lower-portion part 11) forming the skirt portion 11d from below. An upper edge (the lower end 21a of the supporting column portion 21 outside the skirt portion 11d the entrances 24a of the ventilation passages 24 for the later-described orifices 22) of the notch portions 23 is substantially horizontal, and a left edge and a right edge of the notch portions 23 are substantially perpendicular, and the notch portions 23 open on a lower side.

When the detection of the first filling-up fuel feed is carried out, although the gas inside the fuel tank T enters into the first valve chamber 3 from the orifices 22 to create intense foaming inside the fuel entered into the first valve chamber 3, since the orifices 2 are formed in the support portion 3a positioned below the first float 6, a condition wherein the gas entered from the orifices 22 impacts on a regular rise of the first float 6 can be reduced as little as possible. Also, a condition, such that before the first float 6 rises to close the first valve opening 1, the gas passes a side of the first float 6 so as to blow out the fuel inside the first valve chamber 3 to the outside through the first valve opening 1, can be reduced as little as possible. Thereby, in the present embodiment, at the same time when the fuel liquid level reaches the open end 3e of the first valve chamber 3, the first float 6 rises to close the first valve opening 1 so as to reliably carry out the detection of the first filling-up fuel feed.

Then, in the present embodiment, after the fuel feed stops by the detection of the filling-up fuel feed, and the pressure inside the fuel tank T is reduced by the ventilation through the second valve chamber 4 and the second valve opening 2, the first float 6 descends to open the first valve opening 1, and the ventilation through the lower end of the supporting column portion 21, the orifices 22, and the first valve opening 1 is secured as well, thereby allowing the additional fuel feed until the fuel liquid level reaches the upper edge of the notch portions 23.

Namely, in the present embodiment, the orifices 22 are formed in the support portion, and by the notch portions 23 formed in the open end 3e side of the first valve chamber 3, there are formed the entrances 24a of the orifice-ventilation passages 24 communicating with the orifices 22 below the support portion 3a and above the open end 3e. In the illustrated example, the inside of the supporting column portion 21 functions as the orifice-ventilation passages 24, and one portion of the lower end 21a of the supporting column portion 21 functions as the entrances 24a of the orifice-ventilation passages 24.

Then, when the fuel liquid level inside the fuel tank T reaches the open end 3e of the first valve chamber 3, the internal pressure of the fuel tank T rises so as to detect the filling-up fuel feed by the sensor on the fuel feed gun side, and to allow the additional fuel feed after the detection of the filling-up fuel feed until the liquid level reaches the entrances 24a of the orifice-ventilation passages 24.

Also, in the present embodiment, two or more orifices 22 are formed in the support portion 3a, and the orifice-ventilation passages 24 respectively corresponding to the respective orifices 22 are formed.

More specifically, in the present embodiment, the orifices 22 are respectively formed at a symmetric position sandwiching a center 3c of the support portion 3a positioned on a center shaft of the first float 6, in the illustrated example, the center 3c of the disk-shaped member 3b, and at a portion directly below the bottom portion of the first float 6 (see FIG. 3).

The first float 6 has a structure comprising a main member portion 6a having a column shape and a movable member 6b combined with an upper portion of the main member portion 6a. The first float 6 is housed inside the first valve chamber 3 to be movable between a lowered position of contacting a lower end of the first float 6 with the support portion 3a of the first valve chamber 3; and an elevated position of closing the first valve opening 1 by the movable member 6b. The reference numeral 25 represents a spring interposed between the support portion and the first float 6, and providing a certain amount of upward force to the first float 6. The first float 6 and the spring 25 are housed between the device-upper portion 10 and the lower-portion part 11 before the device-upper portion 10 and the lower-portion part 11 are combined. Inside the device-upper portion 10, there is formed a plurality of ribs 26 along an up-and-down direction where the first float 6 is positioned directly below the first valve opening 1. A portion between adjacent ribs 26 respectively becomes one portion of the ventilation passage. When the fuel flows into the first valve chamber 3, the first float 6 moves up to the elevated position, and an upper face of the movable member 6 closes the first valve opening 1. When the fuel feed is stopped, and the fuel flows out of the first valve chamber 3, the first float 6 moves up to the lowered position, and the first valve opening 1 is open. At that time, even when a force attaching the movable member 6b to the first valve opening 1 is applied, by a weight of the main member portion 6a, while inclining the movable member 6b, the movable member 6b can be peeled off from the first valve opening 1.

The second float 7 has the column shape and a structure comprising a conical projecting portion 7a at an upper portion thereof. The second float 7 is housed inside the second valve chamber 4 to be movable between a position contacting a lower end of the second float 7 with the support portion 4a of the second valve chamber 4; and a position closing the second valve opening 2 by entering the projecting portion 7a into the second valve opening 2. In the support portion 4a of the second valve chamber 4, there is formed a plurality of through holes functioning as the passage portion 4b for the fluid. The reference numeral 27 shown in the drawings represents a spring interposed between the support portion and the second float 7, and providing a certain amount of upward force to the second float 7. The second float 7 and the spring 27 are housed between the device-upper portion 10 and the lower-portion part 11 before the device-upper portion 10 and the lower-portion part 11 are combined. Inside the device-upper portion 10, there is formed a plurality of ribs 28 along an up-and-down direction where the second float 7 is positioned directly below the second valve opening 2. A portion between adjacent ribs 28 respectively becomes one portion of the ventilation passage. When the large inclination or the like occurs in the vehicle, the second float 7 moves up to a position closing the second valve opening 2, and the projecting portion 7a closes the second valve opening 2.

Incidentally, obviously, the present invention is not limited to the embodiments explained hereinabove, and includes all embodiments which can obtain the object of the present invention.

While the invention has been explained with reference to the specific embodiments of the invention, the explanation is illustrative and the invention is limited only by the appended claims.

What is claimed is:

1. A valve device for a fuel tank, comprising:
   an upper-portion including a first valve opening and a second valve opening for communicating inside and outside of a fuel tank;
   a lower-portion assembled with the upper-portion, and including a first valve chamber formed below the first valve opening, a second valve chamber formed below the second valve opening and partitioned from the first valve chamber, a partition wall separating the first valve chamber and the second valve chamber, a first support portion having a passage portion for a fluid so that the first valve chamber has an open end below the first support portion, and a second support portion having another passage portion for a fluid;
   a first float disposed inside the first valve chamber and supported on the first support portion to be movable up and down; and
   a second float disposed inside the second valve chamber and supported on the second support portion to be movable up and down,
   wherein the first valve chamber and the second valve chamber are assembled by fitting the lower-portion including the first support portion for the first valve and the second support portion for the second float to the upper-portion, and
   the upper-portion forming the first valve chamber includes a fitted portion having an oval shape in a horizontal cross section, and the lower-portion fitting into the fitted portion has a fitting portion in a horizontal cross section substantially matching with the oval shape of the fitted portion when the upper-portion and the lower-portion fit together.

2. A valve device for a fuel tank according to claim 1, wherein the fitted portion and the fitting portion fit together in an airtight state.

3. A valve device for a fuel tank according to claim 1, wherein the fitted portion and the fitting portion fit together in such a way so as to position one of the fitted portion and the fitting portion inside another of the fitted portion and the fitting portion.

4. A valve device for a fuel tank according to claim 1, wherein the upper-portion and the lower-portion are made of synthetic resin, and at least one of the fitted portion and the fitting portion is formed thinner than another of the fitted portion and the fitting portion.

5. A valve device for a fuel tank according to claim 1, wherein the first float is a valve member for a filling-up fuel-feed detection valve, and the second float is a valve member for a roll-over valve.

* * * * *